United States Patent Office 2,875,171
Patented Feb. 24, 1959

2,875,171

PROCESS OF MAKING CARBON-FILLED POLYAMIDE

Samuel Phillip Foster and Russell Wilbur Peterson, Wilmington, Del., assignors to E. I. du Pont de Nemours and Company, Wilmington, Del., a corporation of Delaware No Drawing. Application July 21, 1954
Serial No. 444,924

3 Claims. (Cl. 260—37)

This invention relates to synthetic linear polycarbonamide compositions containing especially well-dispersed, finely divided carbon, and more particularly to weather-resistant polycarbonamide compositions, and to an improved procedure for preparing these compositions.

That the weather resistance of polymeric materials may be enhanced by incorporating finely-divided carbon in them has been known for some time, the theory being that the carbon particles protect the polymer by shielding it from the harmful effects of ultraviolet light. Hitherto, however, exploitation of this principle with polycarbonamides has been hampered by the lack of any convenient procedure for incorporating an effective amount of sufficiently finely-divided carbon so as to produce a high degree of opacity to ultraviolet light, while at the same time sufficiently excluding relatively large particles or agglomerates of particles so as to avoid unduly sacrificing other desirable attributes of the polymer. As applied to this problem, prior art incorporation procedures, whether accomplished during or after polymerization, have required either expensive drastic mechanical stirring or working of viscous masses, or the use of protective colloids which decompose at polymer-processing temperatures leaving undesirable bubbles or voids in the final product. Prior art procedures are exemplified in U. S. Patents 2,205,722, 2,278,878, 2,341,759, and 2,345,533.

It is an object of the present invention to provide an improved procedure for the preparation of synthetic linear polycarbonamide compositions containing well-dispersed, finely-divided carbon. An additional object is to provide an improved procedure for the preparation of synthetic linear polycarbonamide compositions having improved weather resistance. A more specific object is to provide a process for the preparation of polycarbonamide compositions having superior weather-resistance which process does not require expensive stirring or working of viscous masses or the use of protective colloids. Other objects will be apparent hereinafter.

According to the present invention, it has been found that these objects may be accomplished by a procedure involving adding the carbon to a fluid mass of polycarbonamide-forming reactant, while the latter is polymerizing, and during a critical stage of the polymerization, wherein the carbon is added as a dispersion of colloidal particles in water containing an effective amount of a suitable dispersing agent, and water is evaporated from the resulting mixture at a rate, as expressed in pounds per minute per pound of polymer being produced, averaging at least 0.0038 over the period from commencing addition until substantially all the water present is removed, the addition being completed in substantially less time than that required to evaporate the added water under the circumstances.

In a preferred form of the invention, polycarbonamide-forming reactant, together with enough water to fluidize it at less than polycarbonamide-forming temperatures, e. g., 30 parts of water to 70 parts of reactant by weight, are charged to a suitable polymerization vessel, air is excluded, the vessel is closed, and the charge is heated to polycarbonamide-forming temperature. At a selected pressure in the range of 180–325 p. s. i. g., e. g., 250 p. s. i. g., removal of water is commenced by venting it as steam through a suitable relief valve, and the venting is continued at the selected pressure until less than about 5 percent water is present and the temperature of the batch rises 8 to 15° C. above the temperature at which venting was begun. At this stage of the reaction, i. e., after polymerization has commenced and less than about 5 percent water remains, but before any marked increase in the viscosity of the reacting mass has taken place, addition of the aqueous dispersion of carbon is commenced through a suitable inlet to the vessel. The dispersion contains 5 to 10 percent carbon by weight, which carbon is present substantially entirely in the form of particles having a maximum dimension of less than 200 millimicrons and an average ultimate particle size in the range of 8 to 65 millimicrons. The dispersion also contains 5 to 10 percent, by weight of the carbon, of the sodium salt of a naphthalene-sulfonic acid formaldehyde condensation product as a dispersing agent. Ordinarily the amount of carbon added is in the range of 0.5 to 5 percent by weight of the polymer being produced. During and after the addition heat is supplied so as to continuously evaporate water from the mixture at a rate, as expressed in pounds per minute per pound of polymer being produced, averaging at least 0.0046 over the period from commencing addition until substantially all the added water is removed. The addition is carried out at a steady rate so as to be complete in less than about half the time required to evaporate the added water under the circumstances. After removal of the added water, the polymerization is continued by further heating and removal of water until the polymer attains an inherent viscosity of about 0.9 or more. The molten mass is then discharged from the polymerization vessel to obtain the final composition, which contains the carbon uniformly dispersed therein in very finely divided form and is substantially free of relatively large particles or agglomerates. For optimum results, the product is passed in molten form through a filter having openings not larger than about 0.01 inch prior to final shaping into useful articles.

The aqueous dispersions useful in the practice of the invention contain carbon, substantially all of which is in the form of discrete particles of colloidal size, i. e., having a maximum dimension of less than about 500 millimicrons, and preferably less than about 200 millimicrons. On examination under a microscope at a magnification of about 1000 diameters, substantially all of the particles in the preferred dispersions are submicroscopic. It should be noted, however, that it is difficult to distinguish among various grades of the preferred dispersions by any direct test, and accordingly, they are more conveniently described by reference to their mode of preparation and to the solution light transmission, as hereinafter defined, of carbon-filled polycarbonamides obtained from them via a standardized version of the process of the present invention.

Advantageously, the water used in preparing suitable dispersions is substantially freed of electrolytes before use, e. g., by distillation or deionization, inasmuch as the presence of electrolytes tends to favor agglomeration of the particles.

Commercial "easy-processing" carbon blacks having an average ultimate particle size of about 8 to about 65 millimicrons are preferred as the carbon ingredient of the dispersions. For the preparation of weather-resistant compositions, blacks having an average ultimate particle size in the range of 20 to 40 millimicrons are especially preferred.

It is essential to the preparation of suitable dispersions and to the practice of the invention that an effective amount of a suitable dispersing agent be used. In this connection, a preferred class of dispersing agent consists of the alkali-metal salts of aryl-sulfonic acid/formaldehyde condensation products, such as are commercially available under the trade names of "Daxad," "Leukanol," "Tamol," etc. However, other heat-stable, non-foaming, anionic dispersing agents effective to provide a good dispersion of carbon in water may also be used, as for example, the alkali metal salts of lignin sulfonic acid. The preferred dispersing agents are effective in concentrations of 5 percent or more, preferably 5 to 10 percent, based on the weight of carbon included.

In preparing suitable dispersions, an effective procedure involves mixing the carbon into a solution of water and dispersing agent to obtain a paste containing about 30 percent carbon by weight, and then recycling the paste through a mechanical homogenizer, diluting it with water between cycles to obtain a final product containing 5 to 20 percent carbon by weight, preferably 5 to 10 percent. Various forms of mechanical homogenizer operating on shearing or grinding principles may be used, as for example, ball mills, colloid mills, gear pumps discharging through spring-loaded valves, spinning disc homogenizers, and the like. Of these, the last two are particularly preferred inasmuch as they facilitate continuous recirculation of the mixtures during homogenization. Such treatment serves to break down agglomerates to their ultimate size, to comminute any outsize particles, and to disperse the particles uniformly. For particularly good results, the dispersions so prepared may be reprocessed through a sonic or ultasonic homogenizer, various forms of which are commercially available. Preferably the dispersions are used very shortly after preparation, or else are thoroughly remixed just before use, so as to minimize opportunity for settling.

The polymeric components of the compositions prepared by the process of the present invention are synthetic linear polycarbonamides of the general type disclosed in U. S. Patents 2,071,250, 2,071,253 and 2,130,948. By the term "polycarbonamides" as used herein is meant polymers having recurring units of formula

where R is hydrogen or a monovalent hydrocarbon radical, as integral parts of the main polymer chain, the average number of carbon atoms separating the amide groups being at least two. The invention is particularly concerned with polymers having an inherent viscosity of at least about 0.4, and preferably at least about 0.9, where inherent viscosity is defined as $$\frac{\ln N \text{ rel.}}{C}$$

N rel. being the viscosity of a dilute (e. g., 0.5 g./100 ml.) solution of the polymer in meta-cresol, divided by the viscosity of the meta-cresol in the same units and at the same temperature (e. g., 25° C.), and C being the concentration of the polymer in grams per 100 ml. of solution. Polymers of this type may be prepared from a wide variety of bifunctional reactants, including amino-acids and their amide-forming derivatives, dibasic acid-diamine mixtures and their derivatives, dibasic acid-aminoalcohol mixtures, and the like, as is well known in the art. Extraneous materials may also be included with the reactants, as for example viscosity stabilizers, heat stabilizers, color stabilizers, anti-foaming agents, plasticizers, reinforcing fillers, and the like. Protective colloids may also be included, though as previously indicated, their presence is unnecessary and may be undesirable.

Polymerization of the synthetic linear polycarbonamide-forming reactants with which the invention is concerned may be effected in a variety of ways known to the art, as for example by the method disclosed in the patents mentioned in the preceding paragraph. Especially suitable procedures are described in U. S. Patents 2,163,636 and 2,241,322, involving a preliminary stage of heating in the presence of added water at superatmospheric pressure.

In the practice of the present invention, the aqueous dispersion is added to a fluid mass of polycarbonamide-forming reactants, while the latter are polymerizing, and during a critical stage of the polymerization, i. e., after the reaction has proceeded to a point of ebullition, but before any marked increase in the viscosity of the reacting mass, as disclosed in the aforesaid U. S. Patent 2,278,878. However, for optimum results in preparing weather-resistant compositions, the commencement of addition is delayed until the final stages of the critical period. For example, in a preferred procedure involving a preliminary stage wherein a 50–70% aqueous charge of uncondensed reactant is steadily heated in a closed vessel having a relief valve set to hold the pressure at a selected figure in the range of 180–300 p. s. i. g., active ebullition begins with the commencement of venting at a temperature 3 to 10° C. above the boiling point of water alone at the particular pressure, the mass contains about 5 percent water or less when the temperature reaches 8° to 15° C. above the initial active ebullition point, and the mass becomes too viscous for convenient mixing when the temperature rises more than about 20° C. above the initial active ebullition point. Under such circumstances, it is preferred to commence addition of the aqueous dispersion when the temperature rises 8° to 15° C. above the initial active ebullition point.

The amount of dispersion added may vary widely, but ordinarily will be such as to provide a final composition containing from about 0.5 to about 5 percent, usually about 2 percent of carbon, if it is desired to prepare weather-resistant compositions. Larger amounts may be added with advantage, for example, where it is desired to blend the final product with an unfilled polycarbonamide by melting the two together. In the latter instance, only a relatively small amount of mechanical working is necessary in order to obtain a thorough distribution of the finely-divided carbon throughout the melt.

As previously indicated it is essential to the practice of the invention that water be evaporated from the mixture at a rate, as expressed in pounds per minute per pound of polymer being produced, averaging at least 0.0038 over the period from commencing the addition until substantially all the water present is removed, i. e., until the mixture contains less than about 5 percent water. Desirably the rate is at least 0.0046 in order to provide a margin of safety, and for especailly good results, rates in the range of 0.006 to about 0.01 or more are preferred. At rates slightly lower than 0.0038, enough agglomeration of the carbon particles takes place to prevent the production of desirable weather-resistant compositions.

Heat sufficient to bring about the necessary rate of evaporation may be made available to the mixture in several ways. Desirably, it is done by direct external heating, particularly in operations producing on the order of 25 pounds of polymer per cycle, since in such cases, ordinarily, the ratio of heat transfer surface to mass of charge is relatively large. However, in operations producing 250 to 2,500 pounds per cycle, it is frequently necessary to use a polymerization vessel specially designed to afford a high heat transfer surface ratio, or to make modifications so as to increase the effective heat transfer surface, if direct heating alone is to be relied on. Alternatively, advantage may be taken of a modified polymerization cycle in which the initial aqueous charge is heated in the closed vessel until a pressure well above 180 p. s. i. g. is developed, e. g., 300 p. s. i. g., and the pressure is gradually reduced, e. g., to 180 p. s. i. g., commencing when addition of the dispersion is begun. In this way, part of the sensible heat of the superheated polymerizing mass is made available for evaporative purposes, and the overall rate of evaporation during the critical period is effectively increased.

To establish the rate of evaporation afforded under particular circumstances, resort may be had to preliminary runs in which an equivalent weight of water is substituted for the aqueous dispersion, and added quite rapidly. The rate may then be determined either by collecting the water evaporated, or by noting the time required for the batch temperature to return to the same elevation above the initial active ebullition point (corrected for any difference in pressure) existing at the time addition was commenced.

It is also essential to the practice of the invention that the addition of the aqueous dispersion be completed in substantially less time than that required to evaporate the added water under the circumstances. The maximum time allowable is conveniently calculated from data obtained in preliminary runs described in the preceding paragraph. If the dispersion is added more slowly, the carbon particles become extensively agglomerated and unsatisfactory results are obtained. Preferably the dispersion is added steadily at a rate effective to complete the addition in less than half the time required to evaporate the water added with it, but not so rapidly as to cause a cessation of continuous venting during the critical period from the moment of commencing addition until substantially all the water present is removed. Continuous venting is not essential, however, and a momentary cessation during the addition is frequently experienced without adverse consequences, so long as the overall minimum average rate of evaporation is achieved. A convenient means of adding the dispersion involves pumping it in through an inlet in the top of the polymerization vessel. Various other means which may be used will be apparent to those skilled in the art.

After substantially all the water present is removed, as may be determined for example by measuring the total water evolved or by noting the return of the batch temperature to an elevation 8 to 15° C. above the initial active ebullition temperature, the polymerization is continued with further heating and removal of traces of water in conventional fashion until the desired inherent viscosity has been achieved.

The compositions so produced contain carbon uniformly dispersed in very finely-divided form and are substantially free of relatively large particles and agglomerates of particles as compared to corresponding carbon-filled compositions obtained by prior art techniques not involving the use of protective colloids or the use of drastic mechanical stirring. The distinction may be shown by comparing microphotographs of films of compositions containing identical ingredients but prepared in the different ways, or by comparing the solution light transmission of such compositions, or by comparing their behavior on being extruded in molten form through fine filters. In the latter instance compositions produced by the process of the present invention are readily extruded under conditions where the compositions produced by the prior art techniques above adverted to blind the filters so as to seriously interfere with filtration.

The products obtained are glossy black, and free from dull spots, "burn marks" or smears frequently found in compositions containing less thoroughly dispersed carbon. The products are extruded without difficulty through fine filters having openings of about 0.01 inch or less to obtain compositions having outstanding weather resistance. In many instances compositions having good weather resistance are obtained directly from the polymerization. In all instances, however, both the degree of opacity of the compositions to ultraviolet light, as evidenced by solution light transmission, and the weather resistance, appear to be improved by the mechanical working incident to filtration, and accordingly in preferred embodiments, the process of the present invention involves a filtration step. The filtration may be accomplished as an incident of discharging the product from the polymerization vessel or at later times when the composition is melted before being fabricated. A convenient means of effecting the filtration satisfactorily consists in forcing the molten product through a screen pack containing four screens having a standard mesh of 100, 120, 120, and 100 respectively. Various other means which might be used will be apparent to those skilled in the art.

The invention is further illustrated by means of the following examples, which, however, are not intended to limit its scope.

Example 1.—A dispersion of carbon was prepared as follows: Commercial "easy-processing" channel black having an average ultimate particle size of about 35 millimicrons was stirred into distilled water containing "Daxad" No. 11 to form a paste containing about 25 percent carbon and 6 percent "Daxad" based on carbon. "Daxad" No. 11 is a dispersing agent of the Dewey and Almy Chemical Company, and is described as the sodium salt of a naphthalene sulfonic acid/formaldehyde condensation product. The paste was further mixed in a closed vessel on rolls, passed through a colloid mill at 20 mil clearance, diluted with water to about 22 percent carbon, passed through the mill at 2 mil clearance, diluted to about 20 percent carbon, processed at 1 mil clearance, diluted to 8 percent carbon and processed at 1 mil clearance. This product was fed through a sonic homogenizer operating on a cavitation principle and having a diaphragm oscillating at high intensity at about 360 cycles per second, the rate of throughput used being about 24 pounds per hour. The dispersion thus obtained contained colloidal carbon substantially all of which had a particle size below 200 millimicron. It was used shortly after preparation.

Aqueous 50 percent polyhexamethylenediammonium adipate sufficient to make 25 pounds of polymer was charged to an unstirred electrically-heated, Dowtherm-jacketed, stainless steel vessel having a conical bottom, along with 0.35 pound of a stabilizer consisting of KBr, $NaH_2PO_4 \cdot H_2O$ and $Cu(OOCH_3)_2 \cdot H_2O$ in proportions of about 66:15:1, respectively. The charge was heated to boiling to displace air, the vessel was closed, and the charge was further heated until the pressure reached about 250 p. s. i. g. at which time venting of steam through a preset relief valve was commenced, at a temperature of about 212° C. When the temperature reached 224° C., addition of 6.25 pounds of the aforementioned dispersion was commenced. The dispersion was added steadily by means of a nitrogen-pressurized drop-pot entering the top of the vessel, over a period of about 5 minutes. During this time the pressure dropped to 175 p. s. i. g. and the batch temperature fell to 210° C. Thereafter the pressure rose sharply to the venting pressure of 250 p. s. i. g. The batch temperature returned to 224° C. in 38 minutes from the time of commencing addition, so that the overall average rate of evaporation was about 0.006. Heating and venting at 250 p. s. i. g. were continued until the batch temperature reached about 250° C., at which point the pressure was gradually reduced during one hour to atmospheric and the temperature rose to 270° C. The batch was held for about 75 minutes at 270–274° C. under a nitrogen sweep and then extruded from the bottom of the vessel and quenched in water. The product was received as a smooth black ribbon, which was cut and dried to form a molding powder, further characterized hereinafter.

The final product was a uniform black cold-drawable material having an inherent viscosity of about 1.2 and containing about 2 percent carbon. A measure of the degree of dispersion and degree of opacity to light in terms of its solution light transmission was obtained by the following procedure: One gram of product was shaken with 50 ml. of 85 percent phenol to dissolve the polymer. Shaking was continued during 4 hours, plus or minus 15 minutes. A one ml. aliquot was then diluted to 50 ml. with additional 85 percent phenol, shaken for one minute and the amount of light transmitted through a sample of the diluted material in a 5 cm. cell was determined, using a Beckman Spectrophotometer, at a wave-length of 5780–5790 Angstrom units. This wavelength was found to be that at which the maximum transmittance in both ultraviolet and visible ranges was obtained on representative carbon-filled polycarbonamides. The value so obtained was compared with that of the 85 percent phenol to give the percentage of light transmitted. The standard deviation of the method was 0.6 percent. By this test a value of 5.7 percent was obtained for the product. For convenience in the hereinafter appended claims a value obtained by this test method is therein referred to as a "specific solution light transmission."

A sample of the product was melted and forced through a screen-pack consisting of four screens, in series, having a standard mesh of 100, 120, 120, and 100 respectively. The screening was accomplished without difficulty and the screened product manifested a solution light transmission, as defined above, of 2.9 percent. A part of the screened product was extruded in the form of 30 mil diameter filaments and subjected to artificial weathering under standardized conditions which included continuous exposure to artificial sunlight having an increased intensity in the ultraviolet range and periodic drenching with water. Under these conditions the filaments withstood over 4,500 hours without failure, the point of failure being defined arbitrarily as that at which the samples lost more than 60 percent of their original ability to be elongated. In comparison, corresponding unfilled filaments failed this test in less than 600 hours.

Other filaments made from the screened products were subjected to outdoor weathering in Florida. These filaments had not failed, as defined above, after 18 months' exposure, whereas their unfilled counterparts failed in less than 9 months of similar treatment.

*Example 2.*—The procedure of Example 1 was duplicated in all essential details, except that the scale of operations was 10 times larger and the average rate at which the water was evaporated was 0.0030 pound per minute per pound of polymer being produced. The resulting product was a sludge containing very poorly dispersed carbon. The solution light transmission of this and other similarly prepared unsatisfactory products ranged from about 18 to about 50. Attempts to force the molten product through a screen pack consisting of four screens in series and having a standard mesh of 60, 100, 100 and 60 respectively, resulted in high pack pressures, overloading of the extruder, and irregular discontinuous extrusion.

*Example 3.*—The procedure of Example 2 was duplicated in all essential details, except that a modified polymerization cycle was used in which the batch was heated to 236° C. and 300 p. s. i. g. before commencing addition of the dispersion, and on commencing addition, the pressure was gradually bled down to 200 p. s. i. g. during 20 minutes, taken back to 250 p. s. i. g. during 5 minutes and then completed as before. By this modification the water was evaporated at an average rate of 0.0038 pound per minute per pound of polymer being produced. The product contained well dispersed carbon as observed by microscopic examination and manifested a solution light transmission as received from the polymerization vessel of 9.2 percent.

*Example 4.*—A dispersion similar to that of Example 1 was prepared by adding 40 pounds of carbon to a mixture consisting of 93 pounds of water and 2.4 pounds of dispersing agent, processing the resulting paste through a colloid mill at 2 mil clearance, diluting with 267 pounds of water, reprocessing at 1 mil clearance through the colloid mill, adding another 100 pounds of water and reprocessing through a spring-loaded valve type homogenizer, completing the last step just prior to the time the dispersion was to be used.

Aqueous polyhexamethylenediammonium adipate sufficient to make 2000 pounds of polymer was charged to an unstirred Dowtherm-jacketed autoclave, blanketed with nitrogen, and heated and vented to a temperature of 238° C., 13° C. above the initial active ebullition temperature, at 300 p. s. i. g. The aqueous dispersion just described was then pumped in at a steady rate during 11 minutes. Simultaneously with the addition, the pressure was steadily reduced to 180 p. s. i. g. by controlled venting during 24 minutes, and thereafter vented at 180 p. s. i. g. until the batch temperature reached 250° C. The temperature of the batch dropped to about 200° C. as the pressure decreased to 180 p. s. i. g., and thereafter rose to 209° C., 13° C. above the initial active ebullition temperature (at 180 p. s. i. g.), 50 minutes from the time of commencing the addition. During the 50 minutes, as a result of heat externally supplied and the sensible heat made available by the pressure reduction, water was continuously evaporated from the mixture at an average rate of 0.0046 pound per minute per pound of polymer being produced. When the batch temperature reached 250° C., which required 132 minutes from the time of commencing addition, the batch was further heated to 263° C. during 70 minutes while gradually reducing the pressure to atmospheric, held at 263–270° C. under a nitrogen sweep at atmospheric pressure during 60 minutes, and extruded in ribbon form from the autoclave. The product was quenched in water, flaked, and dried to form a molding powder.

The product was a uniform black material having an inherent viscosity of about 1.2, containing about 2 percent carbon, and having a solution light transmission of about 8.0 percent. The product was extruded through the screen pack of Example 1 without difficulty to give material having a solution light transmission of about 6.0 percent.

The screened products were extruded into 30 mil diameter filaments which withstood about 2000 hours in the artificial weathering test of Example 1 without failure. Test bars molded from the screened product manifested increased stiffness and impact strength, approximately the same tensile strength, and slightly reduced elongation as compared to unfilled material by standard ASTM tests.

*Example 5.*—A 30 percent aqueous solution containing polyhexamethylenediammonium sebacate, polyhexamethylenediammonium adipate, and 6-caprolactam in proportion and amount sufficient to make 20 pounds of polymer containing the polyamide-forming radicals of these intermediates in weight ratios of 77.5/12.5/10 respectively, was heated in the absence of air in a closed unstirred vessel together with 0.0066 pound of Cu(OOCCH$_3$)$_2$.H$_2$O and 0.2 pounds of catechol to 215° C. at 250 p. s. i. g. and vented at that pressure until the batch temperature reached 224° C. At this point an aqueous dispersion of black, similar to that of Example 1, except that it contained 5.0 pounds of water and 0.4 pound of carbon, was added steadily to the mass over a period of 5 minutes. During the addition the pressure dropped to about 200 p. s. i. g. and then returned rapidly to 250 p. s. i. g. Following the addition the pressure was gradually reduced to 190 p. s. i. g. over a period of 10 minutes and vented at that pressure until the batch temperature, which dropped to 203° C. at the end of the addition, rose to 245° C. in 75 minutes. From the commencement of addition until the temperature of the batch again reached a temperature 9° C. above the initial active ebullition point at 190 p. s. i. g. required 28 minutes during which time water was boiled off at an average rate of about 0.009 lb. per minute per pound of polymer being produced. After the batch temperature reached 245° C. the polymerization was completed by further heating to 262° C. during 90 minutes while gradually reducing the pressure to atmospheric, and holding under a nitrogen sweep 60 minutes at 262–265° C. The product was extruded as a ribbon, chilled, cut and dried to form a molding powder.

The product was a uniform black material having an inherent viscosity of 1.11 and containing about 2 percent carbon. The solution light transmission of the product was 37 percent. The composition was cut to form a molding powder which was then remelted and extruded without difficulty through the screen of Example 1 to give a product having a solution light transmission of 4.4 percent. The screened product was extruded over a wire core to form jacketed wire. This wire, and a wire jacketed with the corresponding unfilled composition were exposed to the artificial weathering of Example 1 for 1000 hours and then subjected to a mandrel bend test which comprises wrapping the wire tightly around an 0.090 inch mandrel and counting the number of breaks resulting per 1000 wraps. In this test the composition developed only 10 breaks per 100 wraps, while an unfilled counterpart developed over 100 breaks per 100 wraps.

The carbon-filled polycarbonamides produced by the process of the present invention may be employed in a wide variety of applications, and are particularly useful wherever their black color or increased weather resistance is desirable. For example, they may be used in filament form to make improved brush bristles, fishing nets, auto-seat covers, window screens, etc. As fibers, they may be used to make durable black knitted goods, fabrics, cords, etc. They may be used to form improved protective coatings for fabrics, wire, wood, paper, etc. In the form of molding powder they may be compression molded or injection molded or extruded to form a wide variety of useful articles in which increased weather-resistance is desirable, as for example, components of agricultural machinery, such as gears, sprockets, cams, bearings, seeding plates, levers, spray nozzles, agitators, hose couplings, mower parts, etc.; automotive parts, such as signal light housings, radiator caps, gasoline tank caps, tire-valve caps, hub caps, gear shift knobs, brake air and hydraulic line connectors, license plate brackets, spot-lamp housings, name plates, instrument panels, radio antenna bushings, etc.; electrical parts, such as switch plates, instrument covers, light shields, low-voltage terminal boxes, control handles and knobs, radio and television antenna fittings, door bell plates, etc.; marine hardware, such as blower housings, switch covers, ventilators and ventilator hoods, clutch controls, spark and throttle controls, wire clips, oarlock sockets, pole sockets, light housings, buoys, anchor chocks, port light frames, window channels, pulleys, drain plugs, sheaves, etc.; sporting goods accessories such as golf bag handles, trim and bottoms, bicycle seats, fishing reels, checks and plates for guns, battery cases, tool boxes, etc.; parts for toys, such as handle bar grips, pedal blocks, bell and horn parts, decorative moldings, etc.; and many others.

It will be apparent from the above description and examples that the process of the present invention provides a convenient process for the production of highly useful weather-resistant carbon-filled polycarbonamide compositions, in which it is unnecessary to resort to expensive mechanical stirring or working or the use of protective colloids in order to achieve the necessary superlative degree of subdivision and uniformity of distribution of the carbon particles throughout the polymer.

A further advantage of the process is that the compositions produced are readily extruded through fine filters, inasmuch as such filtration is customarily carried out in fabrication in order to guard against foreign particles which might damage fabrication equipment and in order to facilitate obtaining void-free final articles. Yet another advantage of the process is that it may be in many instances practiced in existing polymerization equipment, without modification thereof by using a modified polymerization cycle. Still another advantage of the process as applied to batch operation is that it may be repeated in the same polymerization vessel without the necessity of cleaning the vessel between batches. For example, in repeating the procedure of Example 1 twenty-one times, with no clean-out between batches, each succeeding batch is as free of agglomerates as the first. Various other advantages will be apparent to those skilled in the art.

Although the invention has been particularly described and illustrated with reference to batch operation, it will be readily appreciated that it may also be applied to semi-continuous or continuous operation. In a continuous operation, for example, where the fluid reactants are passed through an evaporative train, the dispersion may be introduced continuously at an appropriate point in the train. The rate of addition may then be adjusted so that the amount of water added with the dispersion is substantially greater than the amount of water evaporated at the point of introduction. The required minimum rate of evaporation may be achieved during the further passage of the mass through the succeeding portions of the train.

We claim:

1. A process which comprises heating to a temperature 11 to 30° C. above the boiling point of water under an autogenous pressure of 180 to 325 p. s. i. g. a mixture consisting essentially of water and a partially polymerized polycarbonamide of the class obtainable by heating dibasic acid-diamine mixtures and mixtures thereof with monoaminomonocarboxylic acids, and in which the carbonamide groups are separated by a chain of 2 to 10 carbon atoms; adding to the resultant fluid mass a dispersion containing 0.5 to 5 weight percent carbon based on said polycarbonamide and consisting essentially of 5 to 20 weight percent discrete carbon particles smaller than 200 millimicrons and of 8 to 65 millimicrons average ultimate particle size, and water containing at least 5 weight percent, based on said carbon, of a dispersing agent selected from the alkali metal salts of aryl sulfonic acid/formaldehyde condensation products and the alkali metal salts of lignin sulfonic acid; evaporating, and removing from the resulting mixture under an autogenous pressure of 180 to 325 p. s. i. g., an amount of water equal to that added with said dispersion, at a rate which over the period from commencing said addition to completing said removal averages 0.0038 to 0.01 pounds per minute per pound of said polycarbonamide; the aforesaid addition being completed in substantially less time than that required to evaporate the added water; and further heating said mass with removal of water until said polycarbonamide attains an inherent viscosity of 0.4 to 1.2.

2. A process according to claim 1 wherein the dispersion contains 5 to 10 weight percent dispersing agent based on carbon.

3. A process which comprises: heating to a temperature 11 to 30° C. above the boiling point of water under an autogenous pressure of 180 to 325 p. s. i. g. a mixture consisting essentially of water and partially polymerized polycarbonamide selected from the group consisting of polyhexamethylene adipamide, polyhexamethylene sebacamide, and their mixtures with polycaproamide, adding to the resultant fluid mass, a dispersion containing 0.5 to 5 weight percent carbon based on said polycarbonamide and consisting essentially of 5 to 20 weight percent discrete carbon particles smaller than 200 millimicrons and of 8 to 65 millimicrons average ultimate particle size, and water containing 5 to 10 weight percent, based on said carbon, of the sodium salt of a naphthalene sulfonic acid/formaldehyde condensation product as a dispersing agent; evaporating, and removing from the resulting mixture under an autogenous pressure of 180 to 325 p. s. i. g., an amount of water equal to that added with said dispersion, at a rate which over the period from commencing said addition to completing said removal averages 0.0046 to 0.01 pounds per minute per pound of said polycarbonamide; the aforesaid addition being completed in substantially less time than that required to evaporate the added water; and further heating said mass with removal of water until said polycarbonamide attains an inherent viscosity of 0.4 to 1.2.

References Cited in the file of this patent

UNITED STATES PATENTS

| | | |
|---|---|---|
| 2,205,722 | Graves | June 25, 1940 |
| 2,278,878 | Hoff | Apr. 7, 1942 |
| 2,341,759 | Catlin | Feb. 15, 1944 |
| 2,689,839 | Heckert | Sept. 21, 1954 |

UNITED STATES PATENT OFFICE
CERTIFICATE OF CORRECTION

February 24, 1959

Patent No. 2,875,171

Samuel Phillip Foster et al.

It is hereby certified that error appears in the printed specification of the above numbered patent requiring correction and that the said Letters Patent should read as corrected below.

Column 7, line 16, beginning with "For convenience" strike out all to and including "mission." in line 19; column 9, line 22, for "1000 wraps" read -- 100 wraps --.

Signed and sealed this 30th day of June 1959.

(SEAL)
Attest:

KARL H. AXLINE
Attesting Officer

ROBERT C. WATSON
Commissioner of Patents